Jan. 5, 1937. S. PIKER Re. 20,231

MIRROR FRAME DOOR

Original Filed Sept. 16, 1932 2 Sheets-Sheet 1

INVENTOR.
SIDNEY PIKER,

BY Ramsey and Raver
ATTORNEYS

Jan. 5, 1937. S. PIKER Re. 20,231
MIRROR FRAME DOOR
Original Filed Sept. 16, 1932 2 Sheets-Sheet 2
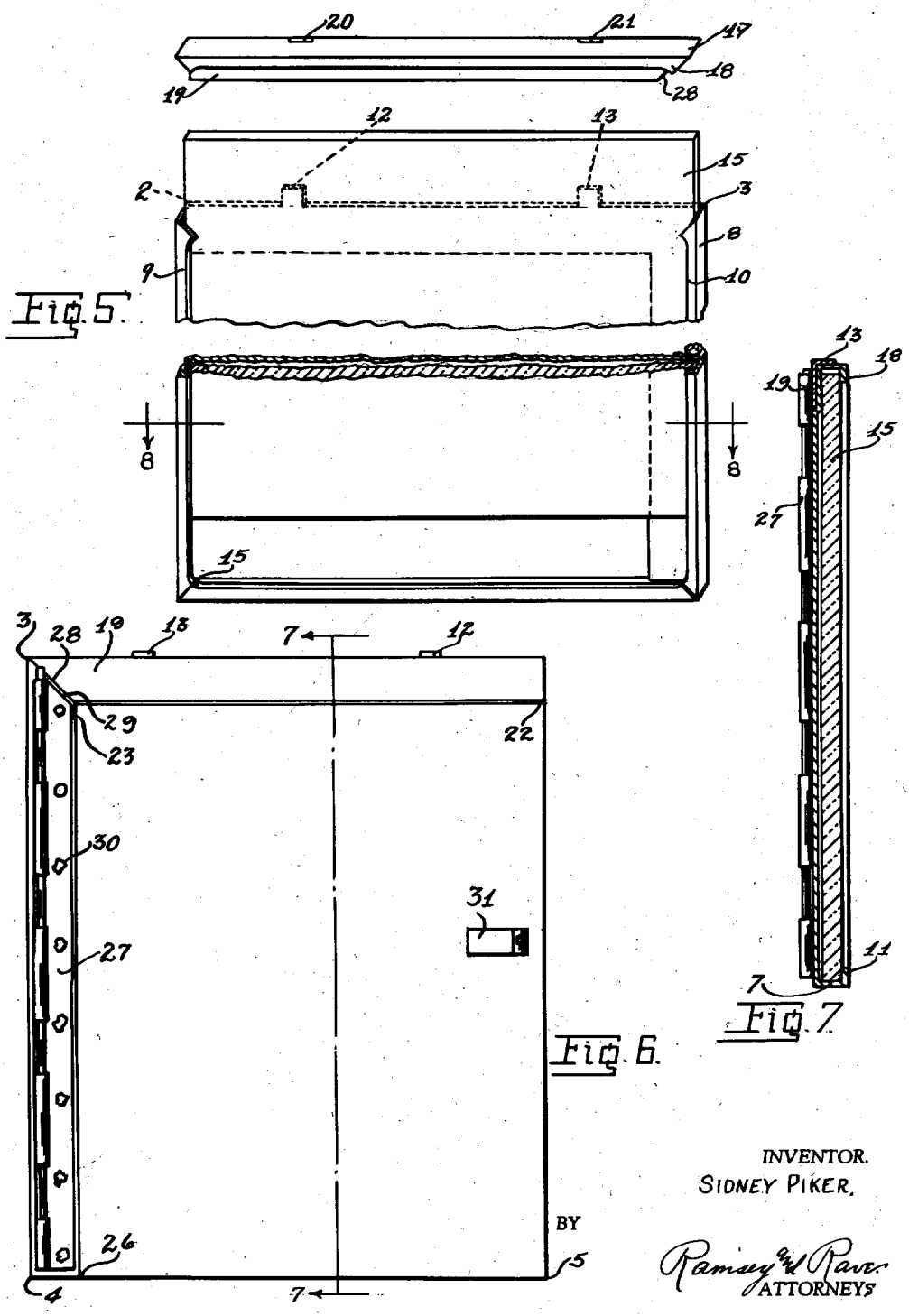
INVENTOR.
SIDNEY PIKER,
BY
Ramsey & Ravenscroft
ATTORNEYS Reissued Jan. 5, 1937

Re. 20,231

UNITED STATES PATENT OFFICE 20,231

MIRROR FRAME DOOR

Sidney Piker, Hamilton, Ohio, assignor to The Hamilton Metal Products Company, Hamilton, Ohio, a corporation of Ohio Original No. 1,954,225, dated April 10, 1934, Serial No. 633,494, September 16, 1932. Application for reissue March 11, 1935, Serial No. 10,495

10 Claims. (Cl. 88—100)

My invention relates to doors for bathroom cabinets, surgical cabinets and the like, in which the door has a mirror mounted in it which may be opened to expose the interior of the cabinet. The door, which closed, has the appearance of an ordinary mirror in a shallow frame, but in reality comprises a hinged door for the cabinet which may readily be swung open for access to the cabinet.

It has heretofore been the practice in the manufacture of cabinet doors of this type, to form the door and then to place a mirror on the outside surface of the door. This construction has been necessary in order to give the back of the door an even and pleasing appearance, since it is exposed to view when the door is opened. The above construction has been expensive, and usually results in a very bulky door, or a door with a very unsightly back. The above is especially true of doors made of sheet metal, of which my novel door is constructed.

Another disadvantage of the doors heretofore constructed is that if the mirror becomes broken it is necessary to replace the whole cabinet door in order to obtain a new mirror door, or to take the door off of the cabinet and to dismantle it and build it completely over containing a new mirror. This cannot be done by the ordinary householder, and usually necessitates the return of the whole cabinet, or at least the door, to the factory for rebuilding.

It is an object of my invention to provide a cabinet door composed of sheet metal, which has none of the above disadvantages and which may be made very cheaply, and which has a mirror covering substantially the entire face. My novel door also has a neat back of balanced and uniform appearance.

It is a further object of my invention to provide a cabinet door, with all of the aforesaid advantages, and in which the mirror, if it becomes broken, may be readily removed from the door, and a new one inserted in its place, without the necessity of removing the door from the cabinet, or in any way dismantling the cabinet.

A further object of my invention is to provide a cabinet door which shall be substantially composed of a single blank with the back portion integral with the frame portion, and in which the use of solder, welding or any similar binding material or operation is unnecessary, except for the attachment of the hinge and the latch to the door.

These and other objects of my invention which will be set forth hereinafter or will be apparent to one skilled in the art upon reading these specifications, I accomplish by that certain construction and arrangement of parts of which I shall now describe a preferred embodiment. Reference is now made to the drawings which form a part hereof, and in which—

Figure 5 is a front perspective of the door with the mirror partly removed and showing the removable edge piece removed. Part of this figure is cut away to conserve space.

Figure 6 is a back perspective of the assembled door.

Figure 7 is a section of Figure 6 taken along the section line 7—7.

Figures 1, 2:
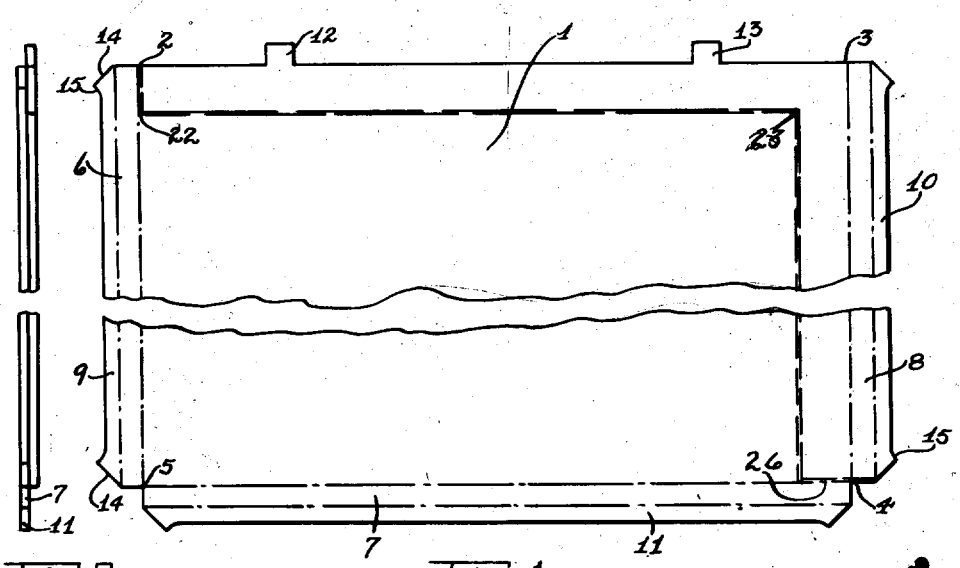
Figure 1 is a front elevational plan view of the blank from which my door is made.
Figure 2 is a side elevation of the view shown in Figure 1.
Figure 3:
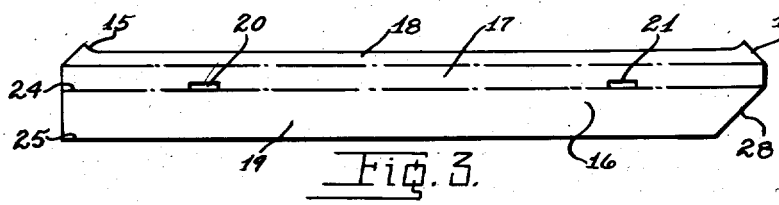
Figure 3 is a plan view of the removable top edge blank.
Figure 8:
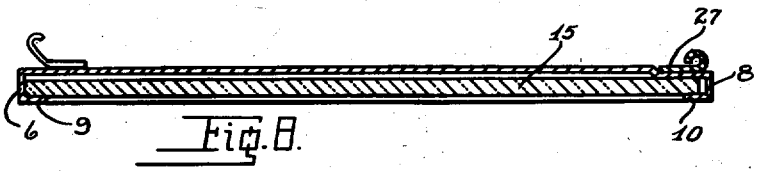
Figure 8 is a section of Figure 5 taken along the section line 8—8.
Figure 4:
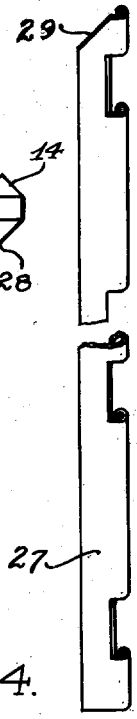
Figure 4 is a perspective of the hinge, with part cut away to conserve space.

In the practice of my invention I provide a metal blank 1 composed of sheet metal or any similar material, with side and top and bottom edge portions 2, 3, 4, and 5 outlining the size of the finished door. Integral with the surface having the edge portions 2, 3, 4, and 5 are the three side pieces 6, 7, and 8, and contiguous with these side pieces are the front frame or edge pieces 9, 10 and 11. Contiguous with the fourth side 2, 3, of the blank are two projecting ears 12 and 13. The ends of the front edges are beveled as at 14 and have circular cutout portions 15, so as to present a curved corner in the finished door. The three side pieces are all of the same width, which is slightly greater than the thickness of the mirror itself. There is a second blank 16 with the side piece 17 of the same length as the side piece 7 on the other blank. Integral with this side piece 17 there is the front edging 18, and integral with this side piece 17, but on the opposite side from the front edging, is the supplemental back wall 19. There are two slits 20 and 21 cut in the side piece 17 and so positioned that they will register with the two ears 12 and 13. This blank 16 represents the removable side piece and front edging for the fourth side. On the back wall there is the depression 22, 23 of such a width that the distance from the inner edge of the depression to the edge of the blank, i. e., 22—2 is equal to the width 24—25 of the supplemental back wall 19, and of a depth equal to the gauge of the metal sheet. There may also be a depression 23, 26, on the back wall to accommodate the hinge 27 (Fig. 4) so as to present an even surface when this hinge is in place, and when the supplemental back wall 19 is in position. The end of the supplemental back wall 19 may be beveled as at 28, and also the end of the hinge piece as at 29, so that they will register with each other. The hinge 27 is of the ordinary strip type and composed of the same material as the blanks, having a length equal to the side 3—4 of the back wall.

In forming and assembling my invention, the side pieces 6, 7 and 8 are bent perpendicular to the back portion 2, 3, 4, 5, and the three front edges 9, 10, and 11 are bent inward and perpendicular to the side pieces and parallel to the back wall, giving the appearance as illustrated in Figure 5. The blank 16 has the front edge 18 and the supplemental back wall 19 bent parallel to each other and perpendicular to the plane of web 17, and both projecting in the same direction from the web 17. The hinge piece 27 is fastened on the back of the back wall 2, 3, 4, 5, in the depression 23—26 as in Figure 6. In my preferred embodiment this fastening is done by spot welding as at 30. A latch 31 may be spot welded on the back of the back wall on the opposite side from the hinge. This latch 31 in my preferred embodiment is in the form of a projecting spring adapted to keep my cabinet door closed by friction with the cabinet frame.

In assembling my door the mirror 15 is slipped into the frame formed from my blank 1 through the fourth side, which does not have a side piece or front edge. After the mirror has been slid in, the piece formed from the blank 16 is placed in position by slipping the piece over the fourth edge 2—3 of the door in such a manner that the ears 12, 13, will slip through the slits 20, 21, and the supplemental wall portion 19 will register in the depression 22, 23, and against the bevel 29 of the hinge 27. The ears 12, 13, are now bent toward the front of the mirror and down onto the edge 17 (as illustrated in Fig. 7). It may be desirable to slide a piece of paper or cardboard behind the mirror in order to steady it, but this packing is merely incidental and well known in the art. My mirror door may now be swung on its hinge on the front of a cabinet, and it will give a very pleasing appearance to the back as well as to the front.

I wish particularly to call attention to the cheapness of construction incident to my invention. The whole of my door frame is made out of a single gauge of sheet metal, and in reality consists of only two blanks. These blanks may be cheaply and easily pressed out of ordinary cheap sheet stock. The hinge and the latch may be made from the same stock, and the only welding or fastening necessary is the attaching of the hinge and the latch. If the mirror in my invention should become broken, it is only necessary to remove the removable piece made from the blank 16 by bending back the two ears 12 and 13, and then sliding out the broken mirror and inserting a new one in its place. It will not be necessary to remove the door from the cabinet, or to in any way dissemble the cabinet itself. The portions 15 on the ends of the front edging come together in the finished product, and present curved corners which are very pleasing in appearance. It is not necessary to fasten the corners in any way, since the natural stiffness of the metal will keep them in position. The back of my door gives an even appearance, since the hinge and the supplemental back wall are sunk into the back wall itself.

It is to be understood that different forms of my preferred form may be made without departing from the spirit of my invention.

Having thus described my invention, what I claim as new and desire to secure by Letters Patent, is:

1. In a metal frame door, the combination of a flat four-sided back, three upwardly projecting side pieces integral with three sides of said back, three relatively narrow front pieces integral with said side pieces and projecting at right angles therewith, a plurality of ears projecting from and integral with the fourth side of said back, a removable side and front piece integral with a narrow supplemental back piece, said removable side piece containing slits registering with said ears and positioned on said fourth side of said back in such a manner that said supplemental back piece lies over said back piece, and said ears being bent over said fourth side piece, so as to hold said removable side piece in position relative to said back piece, said back piece having a depression to accommodate said supplemental back piece so as to present a uniform smooth surface.

2. In a metal cabinet door, the combination of a mirror, a frame therefor comprising a back, three sides and front edges integral with said back, the fourth side being open, a separate piece constituting a fourth side and front edge and supplemental back, and means for attaching said fourth side and front edge and supplemental back to said back, said back having a depression of a depth equal to the gauge of the metal to accommodate said supplemental back.

3. In a metal frame door, a combination of a back, three sides and relatively narrow front pieces integral therewith, a fourth side and front piece and supplemental back, said back having a recess of a depth equal to the gauge of the metal to accommodate said supplemental back, and means integral with said back for fastening said fourth side and front piece and supplemental back onto said back.

4. In a metal frame door, the combination of a back, three sides and relatively narrow front pieces integral therewith, a fourth side and front piece and supplemental back, said back having a recess of a depth equal to the gauge of the metal to accommodate said supplemental back, and means integral with said back for fastening said fourth side and front piece and supplemental back onto said back, said means comprising at least one projecting ear.

5. In a metal mirror door, the combination of a mirror and a frame, said frame comprising a back and three sides integral with said back and three front edges integral with said side pieces, the fourth side having a depression of a depth equal to the gauge of the metal, a removable side piece comprising a side, a front edge, and a narrow back piece integral with said side and said front edge, slits positioned in said side piece, and projecting ears from said back piece being projected through said slits for the purpose of holding said removable side piece in position relative to said back piece after said mirror has been inserted in said first mentioned piece, said narrow back piece being accommodated by said depression in said back.

6. In a frame for a mirror or the like the combination of a four sided plate member having top, bottom, and side edges, a mirror or the like receiving channel projecting from three of said edges and each comprising a side and a front piece adapted to overlie the mirror or the like, a plurality of bendable ears projecting from the fourth side of the plate and lying in the plane of the plate, said bendable ears being positioned inwardly of the corners thereof, and a removable channel comprising back, side, and front members, said front member being co-planar with the fronts of the adjacent receiving channels, said side of the removable channel having slits therein adjacent to the back of the channel and in registry with the ears of the plate through which slits said bendable ears pass, and said ears being adapted to be bent at right angles to the plate into engagement with the said side of the removable channel after said channel is in position for securing same in said position.

7. In a frame for a mirror or the like the combination of a four sided plate member having top, bottom, and side edges, a mirror or the like receiving channel projecting from three of said edges and each comprising a side and a front piece adapted to overlie the mirror or the like, a plurality of bendable ears projecting from the fourth side of the plate and lying in the plane of the plate, said bendable ears being positioned inwardly of the corners thereof, and a removable channel comprising back, side, and front members, said front member being co-planar with the fronts of the adjacent receiving channels, said side of the removable channel having slits therein adjacent to the back of the channel and in registry with the ears of the plate through which slits said bendable ears pass, and said ears being adapted to be bent at right angles to the plate into engagement with the said side of the removable channel after said channel is in position for securing same in said position, said back of the removable channel being of a width greater than the front thereof and overlying the outer surface of the plate.

8. In a frame for a mirror or the like the combination of a four sided plate member having top, bottom, and side edges, a mirror or the like receiving channel projecting from three of said edges and each comprising a side and a front piece adapted to overlie the mirror or the like, a plurality of bendable ears projecting from the fourth side of the plate and lying in the plane of the plate, said bendable ears being positioned inwardly of the corners thereof, and a removable channel comprising back, side, and front members, said front member being co-planar with the fronts of the adjacent receiving channels, said side of the removable channel having slits therein adjacent to the back of the channel and in registry with the ears of the plate through which slits said bendable ears pass, and said ears being adapted to be bent at right angles to the plate into engagement with the said side of the removable channel after said channel is in position for securing same in said position, said back of the removable channel being of a width greater than the front thereof and overlying the outer surface of the plate, and a hinge plate secured to the outer surface of the back plate adjacent one edge thereof.

9. In a frame for a mirror or the like comprising a back plate of an area substantially coextensive with the area of the mirror or the like to be supported thereby, a channel around the perimeter of the back plate and having an opening therein substantially equal to the width of said mirror to permit the insertion of said mirror or the like therein and said receiving channel including the back plate as one of its legs, a front flange for overlying the mirror and a side connecting the front flange with the back plate, a plurality of bendable tabs projecting from the portion of the perimeter of the back plate which is free of the receiving channel, said tabs lying in the plane of the back plate, and a removable channel adapted to be secured to the back plate for completing the channel frame around the perimeter of the back plate and comprising a front flange, a back flange, and a connecting side, said back flange being of a width greater than the width of the front flange, and the side of the removable channel having formed therein adjacent to the back flange a plurality of slits adapted to register with and receive the bendable tabs of the back plate which tabs are subsequently bent to a position at right angles to the back plate against the removable channel side to secure the same in position.

10. In a frame for a mirror or the like comprising a back plate of an area substantially coextensive with the area of the mirror or the like to be supported thereby, a channel around the perimeter of the back plate and having an opening therein substantially equal to the width of said mirror to permit the insertion of said mirror or the like therein and said receiving channel including the back plate as one of its legs, a front flange for overlying the mirror and a side connecting the front flange with the back plate, a plurality of bendable tabs projecting from the portion of the perimeter of the back plate which is free of the receiving channel, said tabs lying in the plane of the back plate, a removable channel adapted to be secured to the back plate for completing the channel frame around the perimeter of the back plate and comprising a front flange, a back flange, and a connecting side, said back flange being of a width greater than the width of the front flange, and the side of the removable channel having formed therein adjacent to the back flange a plurality of slits adapted to register with and receive the bendable tabs of the back plate which tabs are subsequently bent to a position at right angles to the back plate against the removable channel side to secure the same in position, and a hinge plate secured to the outer surface of the back plate.

SIDNEY PIKER.